(12) United States Patent
George et al.

(10) Patent No.: US 8,280,259 B2
(45) Date of Patent: Oct. 2, 2012

(54) RADIO-OVER-FIBER (ROF) SYSTEM FOR PROTOCOL-INDEPENDENT WIRED AND/OR WIRELESS COMMUNICATION

(75) Inventors: Jacob George, Horseheads, NY (US);
Michael Sauer, Corning, NY (US);
Dean M. Thelen, Addison, NY (US)

(73) Assignee: Corning Cable Systems LLC, Hickory, NC (US)

( * ) Notice: Subject to any disclaimer, the term of this patent is extended or adjusted under 35 U.S.C. 154(b) by 317 days.

(21) Appl. No.: 12/618,613

(22) Filed: Nov. 13, 2009

(65) Prior Publication Data

US 2011/0116794 A1    May 19, 2011

(51) Int. Cl.
*H04B 10/00* (2006.01)

(52) U.S. Cl. ........ 398/115; 398/116; 398/117; 398/118; 398/128; 398/130; 398/45; 398/48; 398/49; 398/50; 398/58; 455/561; 455/562; 455/562.1; 370/338; 370/392; 370/351; 370/342; 370/352; 370/328; 370/389; 370/503; 370/466

(58) Field of Classification Search .................. 398/115, 398/45, 48, 46, 49, 79, 66, 70, 72, 68, 98, 398/99, 100, 57, 58, 116, 117, 118, 71, 128, 398/130, 126; 455/561, 562.1, 562, 445, 455/422, 524, 560, 403; 370/338, 392, 342, 370/329, 315, 328, 318, 351, 352, 465, 466, 370/503, 474

See application file for complete search history.

(56) References Cited

U.S. PATENT DOCUMENTS

| | | | |
|---|---|---|---|
| 6,674,966 B1 * | 1/2004 | Koonen | 398/70 |
| 6,865,390 B2 * | 3/2005 | Goss et al. | 455/445 |
| 2002/0012336 A1 | 1/2002 | Hughes et al. | 370/347 |
| 2002/0045519 A1 | 4/2002 | Watterson et al. | 482/54 |
| 2002/0197984 A1 * | 12/2002 | Monin et al. | 455/419 |
| 2003/0069922 A1 | 4/2003 | Arunachalam | 709/203 |
| 2004/0106435 A1 | 6/2004 | Bauman et al. | 455/562.1 |
| 2004/0215723 A1 | 10/2004 | Chadha | 709/206 |
| 2004/0267971 A1 | 12/2004 | Seshadri | 710/8 |
| 2006/0172775 A1 * | 8/2006 | Conyers et al. | 455/561 |
| 2007/0050451 A1 | 3/2007 | Caspi et al. | 709/204 |
| 2008/0311944 A1 | 12/2008 | Hansen et al. | 455/517 |
| 2009/0081985 A1 | 3/2009 | Rofougaran et al. | 455/326 |
| 2009/0088072 A1 | 4/2009 | Rofougaran et al. | 455/13.1 |
| 2010/0189439 A1 | 7/2010 | Novak et al. | 398/67 |
| 2010/0266287 A1 * | 10/2010 | Adhikari et al. | 398/116 |
| 2011/0045767 A1 | 2/2011 | Rofougaran et al. | 455/16 |
| 2011/0116393 A1 | 5/2011 | Hong et al. | 370/252 |

* cited by examiner

*Primary Examiner* — Hanh Phan
(74) *Attorney, Agent, or Firm* — C. Keith Montgomery

(57) ABSTRACT

An optically-switched fiber optic communication system, such as a Radio-over-Fiber (RoF) based optical fiber link system, may be used to increase the range of peer-to-peer communications. The optically-switched fiber optic communication system may include a head-end unit (HEU) having an optical switch bank. Fiber optic cables comprising optical fibers optically couple the HEU to one or more remote access points in different coverage areas. The optical switch bank in the HEU provides a link between the remote access points in the different coverage areas such that devices in the different cellular coverage areas can communicate with each other over the optical fibers through the HEU. By using the optically-switched fiber optic communication system, the range and coverage of communication between devices may be extended such that devices in different coverage areas and devices using different communication protocols can communicate.

31 Claims, 11 Drawing Sheets

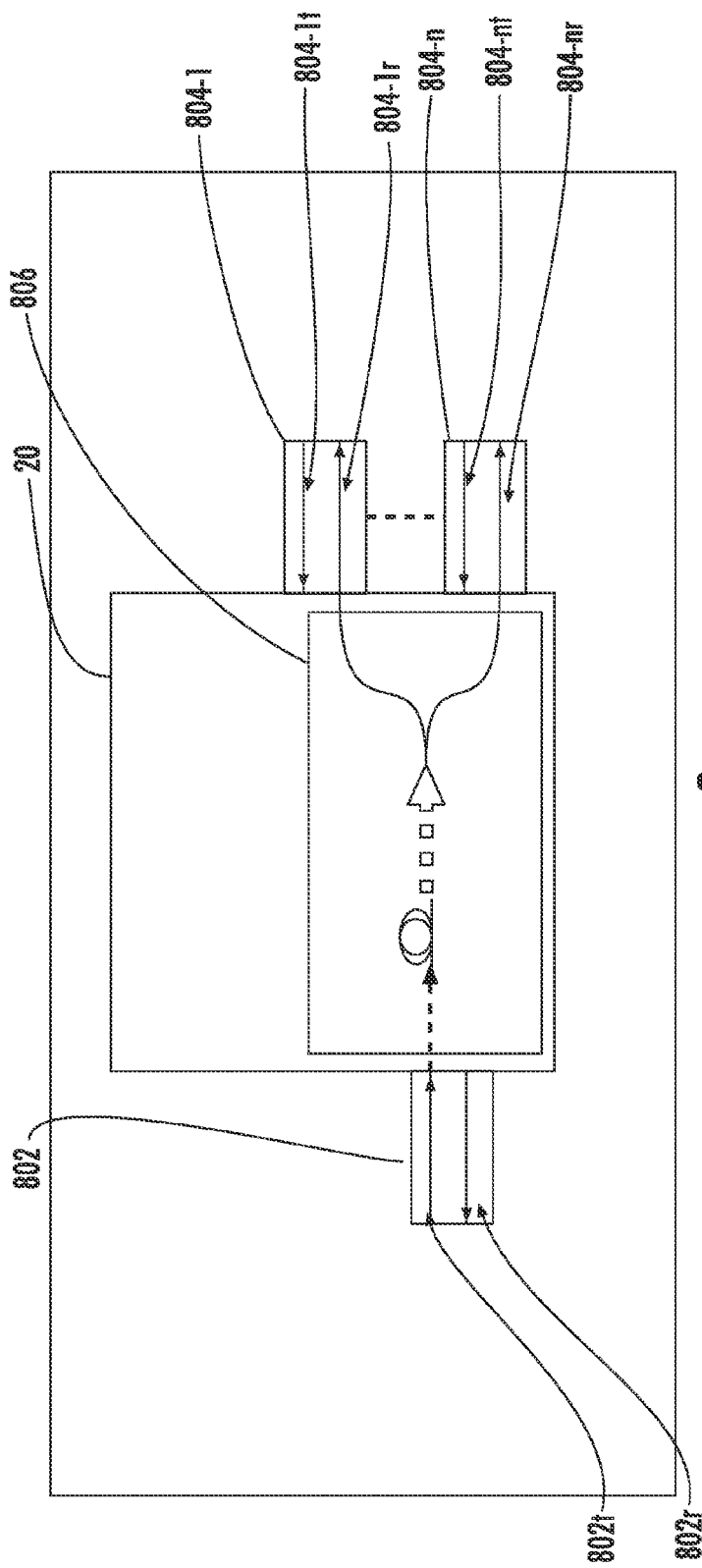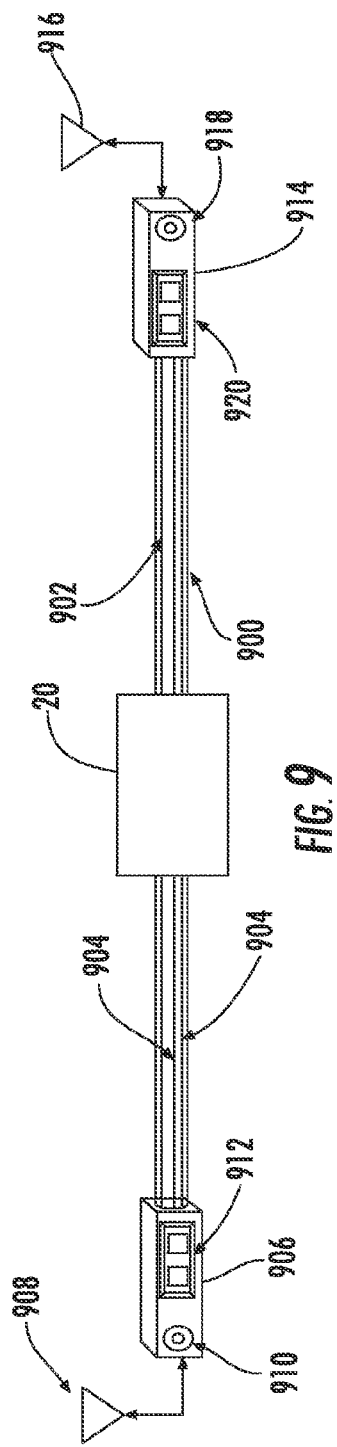

RADIO-OVER-FIBER (ROF) SYSTEM FOR PROTOCOL-INDEPENDENT WIRED AND/OR WIRELESS COMMUNICATION

BACKGROUND

1. Field of the Disclosure

The technology of the disclosure relates to wired and/or wireless communication systems employing a Radio-over-Fiber (RoF) communication system.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Wireless communication systems communicate with wireless devices called "clients," which must reside within the wireless range or "cell coverage area" in order to communicate with an access point device.

One approach to deploying a wireless communication system involves the use of "picocells." Picocells are radio-frequency (RF) coverage areas. Picocells can have a radius in the range from a few meters up to twenty meters as an example. Combining a number of access point devices creates an array of picocells that cover an area called a "picocellular coverage area." Because the picocell covers a small area, there are typically only a few users (clients) per picocell. This allows for simultaneous high coverage quality and high data rates for the wireless system users, while minimizing the amount of RF bandwidth shared among the wireless system users. One advantage of picocells is the ability to wirelessly communicate with remotely located communication devices within the picocellular coverage area.

One type of wireless communication system for creating picocells is called a "Radio-over-Fiber (RoF)" wireless system. A RoF wireless system utilizes RF signals sent over optical fibers. Such systems include a head-end station optically coupled to a plurality of remote units. The remote units each include transponders that are coupled to the head-end station via an optical fiber link. The transponders in the remote units are transparent to the RF signals. The remote units simply convert incoming optical signals from the optical fiber link to electrical signals via optical-to-electrical (O/E) converters, which are then passed to the transponders. The transponders convert the electrical signals to electromagnetic signals via antennas coupled to the transponders in the remote units. The antennas also receive electromagnetic signals (i.e., electromagnetic radiation) from clients in the cell coverage area and convert the electromagnetic signals to electrical signals (i.e., electrical signals in wire). The remote units then convert the electrical signals to optical signals via electrical-to-optical (E/O) converters. The optical signals are then sent to the head-end station via the optical fiber link.

Wired and wireless peer-to-peer analog and digital communications are generally limited in range and coverage, respectively. Enhancing the range of wired peer-to-peer connections may require complicated amplifying and/or repeating requirements. Extending the coverage of wireless peer-to-peer connections typically requires a denser antenna deployment and/or transmitted power increase, which may be limited by government regulations, wireless standards, and battery peak power and energy storage considerations. In addition, extending the coverage may be prohibited by the use of proprietary protocols, such as medical equipment.

SUMMARY OF THE DETAILED DESCRIPTION

Embodiments disclosed in the detailed description include optically-switched fiber optic wired and/or wireless communication systems and related methods to increase the range of wired and/or wireless peer-to-peer communication systems. In one embodiment, the optically-switched fiber optic wired and/or wireless communication system may include a head-end unit (HEU) having an optical switch bank. A plurality of fiber optic cables, each of the plurality of fiber optic cables comprising at least one optical fiber, are configured to carry a Radio-over-Fiber (RoF) signal from the HEU to a plurality of remote access points. A first one of the plurality of remote access points is configured to form a corresponding first cellular coverage area where a first peer device is located. A second one of the plurality of remote access points is configured to form a corresponding second, different cellular coverage area where a second peer device is located. The optical switch bank is configured to dynamically establish a RoF-based optical link over at least one of the plurality of fiber optic cables such that the first peer device communicates with the second peer device at least in part over the RoF-based optical link.

Another embodiment disclosed herein provides a method of enabling communication between a first peer device in a first cellular coverage area and a second peer device in a second, different cellular coverage area. The method may include optically linking a plurality of remote access points to a HEU via a plurality of fiber optic cables, each of the plurality of fiber optic cables comprising at least one optical fiber and configured to carry a RoF signal from the HEU to the plurality of remote access points. A first one of the plurality of remote access points is configured to form the first cellular coverage area. A second one of the plurality of remote access points is configured to form the second, different cellular coverage area. A request is received to establish communications between the first peer device and the second peer device, and in response to the request, dynamic establishment of a RoF-based optical link is performed over at least one of the plurality of fiber optic cables to allow the first peer device to communicate with the second peer device at least in part over the RoF-based optical link.

The systems and methods disclosed herein can be configured to overcome the limitations of traditional wired and/or wireless ("wired/wireless") peer-to-peer communications by combining the low loss, high bandwidth nature of optical fiber with an appropriate optical switching network to enhance coverage (where needed). In one embodiment, the optically-switched fiber optic wired/wireless communication system is a RoF-based link system. In another embodiment, the RoF-based link system is nearly protocol transparent (i.e., independent of protocol).

The optically-switched fiber optic wired/wireless communication systems and methods disclosed herein may include dense fiber cable deployment (as in picocell), which facilitates cell-to-cell peer-to-peer communication. By taking advantage of the fiber cable architecture of the optically-switched fiber optic wired/wireless communication system, such as a RoF Wireless Local Area Network (WLAN) picocell system, the peer-to-peer communication range is extended to be cell-to-cell. In this regard, devices in any two cells can communicate in the peer-to-peer mode independent of their physical distance, such that the peer-to-peer range extends across entire indoor installation areas.

In addition, the optically-switched fiber optic wired/wireless communication systems and methods disclosed herein can use optical cable links that are nearly transparent to wireless protocols, thereby eliminating proprietary protocol compliance requirements. Thus, a broad variety of current applications/equipment are supported without any infrastructure upgrade, including switched video connection, switched video with Internet connection, peer-to-peer proprietary protocol equipment (e.g. medical), peer-to-peer videoconferencing, and broadcast capability (cellular and video). In addition, future applications/equipment will be possible without any infrastructure upgrade.

The optically-switched fiber optic wired/wireless communication system and method disclosed herein take advantage of a local wireless network, such as a WLAN, to initiate peer-to-peer switching, because the switching only needs a very low data rate connection. Multiple input options may be supported, such as a radio frequency (RF) cable/antenna input, an optical fiber input, and an electrical power input. Multiple output options can be used, including an RF cable/antenna output, an optical fiber output with optical/electrical conversion, an optical fiber output with the E/O conversion bypassed, and an electrical power output. The optically-switched fiber optic wired/wireless communication system disclosed herein can be upgraded to higher frequencies, such as 60 Gigahertz (GHz).

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 8 is a schematic diagram of an exemplary embodiment of using optical amplification and splitting at a HEU of an optically-switched fiber optic wired/wireless communication system for broadcasting video to peer-to-peer devices;

FIG. 9 is a schematic diagram of an exemplary embodiment of an optically-switched fiber optic wired/wireless communication system that illustrates an exemplary connection between a HEU and broadband transponders in two different locations;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include optically-switched fiber optic wired and/or wireless communication systems and related methods to increase the range of wired and/or wireless peer-to-peer communication systems. In one embodiment, the optically-switched fiber optic wired and/or wireless communication system may include a head-end unit (HEU) having an optical switch bank. A plurality of fiber optic cables, each of the plurality of fiber optic cables comprising at least one optical fiber, are configured to carry a Radio-over-Fiber (RoF) signal from the HEU to a plurality of remote access points. A first one of the plurality of remote access points is configured to form a corresponding first cellular coverage area where a first peer device is located. A second one of the plurality of remote access points is configured to form a corresponding second, different cellular coverage area where a second peer device is located. The optical switch bank is configured to dynamically establish a RoF-based optical link over at least one of the plurality of fiber optic cables such that the first peer device communicates with the second peer device at least in part over the RoF-based optical link. These systems and methods can overcome the limitations of traditional wired/wireless peer-to-peer communications by combining the low loss, high bandwidth nature of optical fiber with an appropriate optical switching network to enhance coverage (where needed). In one embodiment, the optically-switched fiber optic wired/wireless communication system is a RoF-based link system. In another embodiment, the RoF-based link system is nearly protocol transparent (i.e., independent of protocol).

Figure 1:
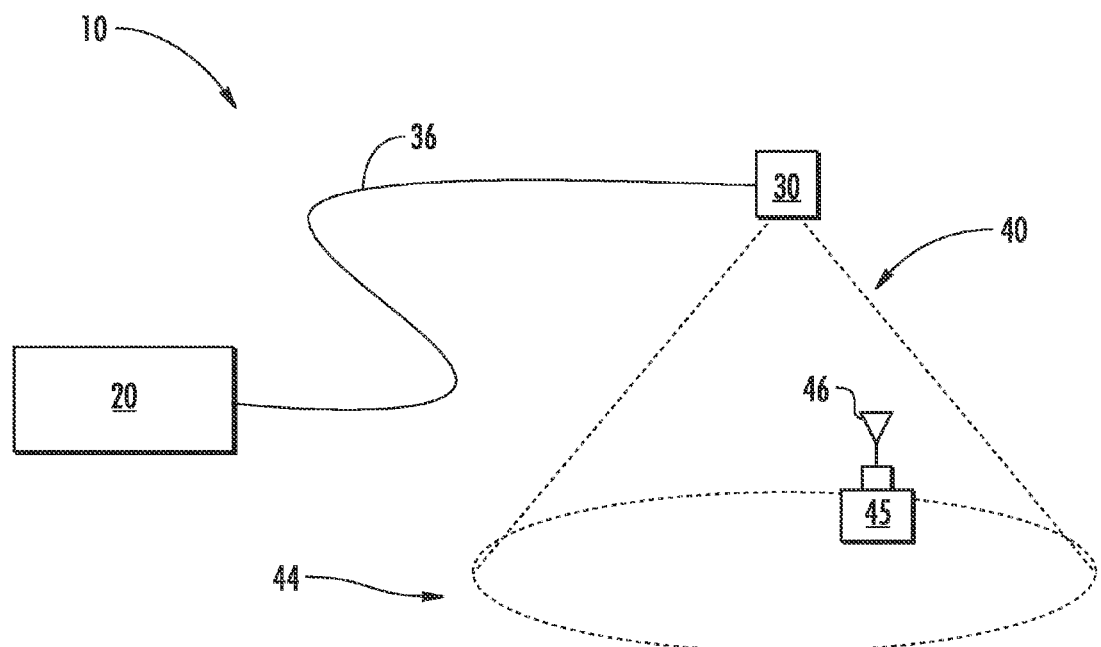
FIG. 1 is a schematic diagram of an exemplary generalized embodiment of an optical fiber-based wireless picocellular system.

Before discussing specifics regarding exemplary embodiments of optically-switched fiber optic wired/wireless communication systems disclosed herein starting with FIG. 4, FIGS. 1-3 are first set forth and discussed to describe a generalized embodiment of an optical-fiber-based wireless picocellular system. In this regard, FIG. 1 is a schematic diagram of a generalized embodiment of an optical-fiber-based wireless picocellular system 10 (also referred to herein as "system 10"). The system 10 includes a head-end unit (HEU) 20, one or more transponder or remote antenna units 30, or simply referred to herein as "remote units 30", and an optical fiber radio frequency (RF) communication link 36 that optically couples the HEU 20 to the remote unit 30. As discussed in detail below, the system 10 has a picocell 40 substantially centered about the remote unit 30. The remote units 30 form a picocellular coverage area 44. The HEU 20 is adapted to perform or to facilitate any one of a number of RF-over-fiber applications, such as radio frequency identification (RFID), wireless local area network (WLAN) communication, Bluetooth®, or cellular phone service. Shown within the picocell 40 is a device 45. The device 45 may be a hand-held communication device (e.g., a cellular telephone or personal digital assistant (PDA)), a personal computer, a video monitor, or any other device that is capable of communicating with a peer device. The device 45 may have an antenna 46 associated with it.

Figure 2:
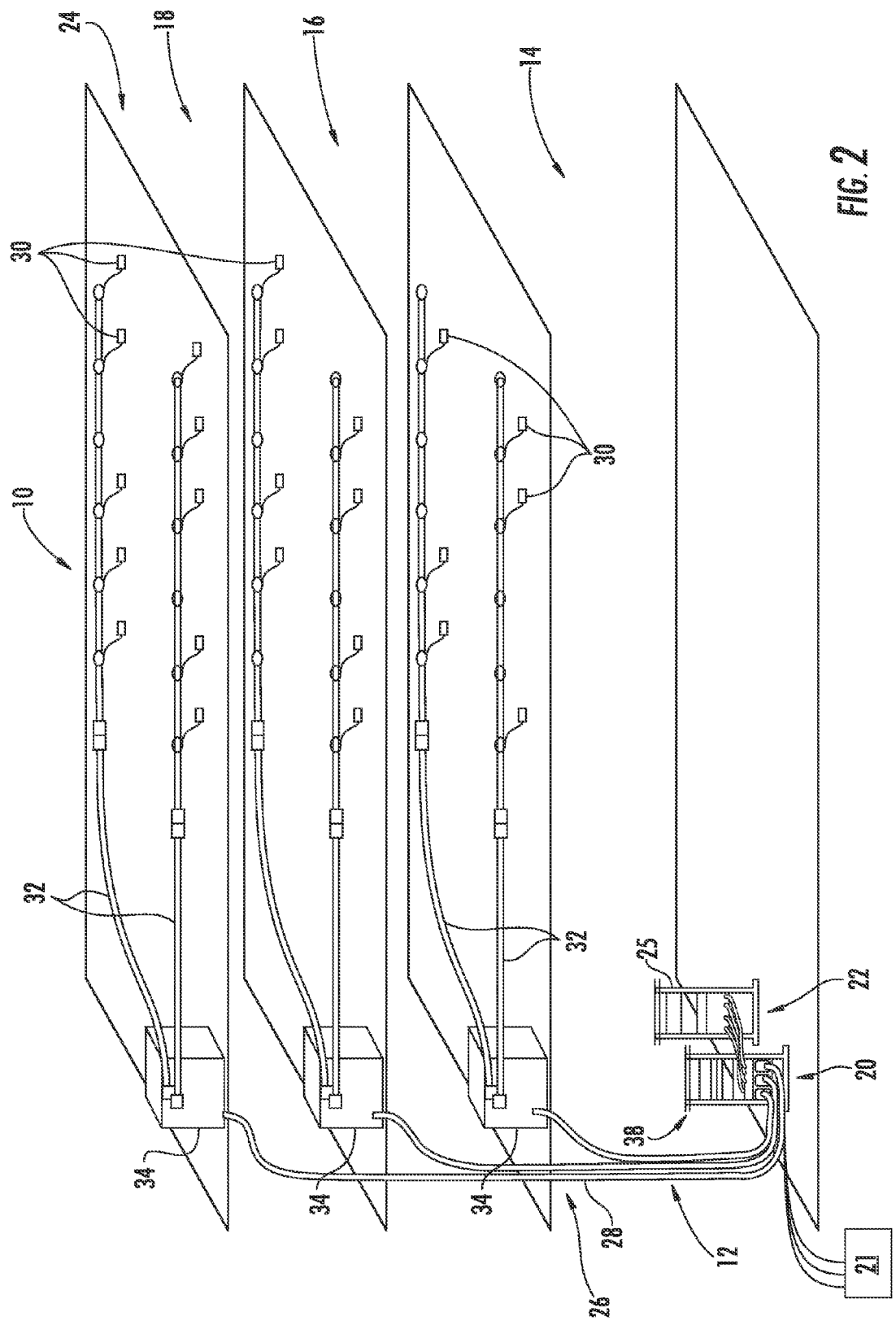
FIG. 2 is a schematic diagram of an exemplary Radio-over-Fiber (RoF) distributed communication system.

Although the embodiments described herein include any type of optically-switched fiber optic wired/wireless communication system, including any type of RoF system, an exemplary RoF distributed communication system 11 is provided in FIG. 2 to facilitate discussion of the environment in which the peer-to-peer communication between two devices in different cells is enabled. FIG. 2 includes a partially schematic cut-away diagram of a building infrastructure 12 that generally represents any type of building in which the RoF distributed communication system 11 might be employed and used. The building infrastructure 12 includes a first (ground) floor 14, a second floor 16, and a third floor 18. The floors 14, 16, 18 are serviced by the HEU 20, through a main distribution frame 22, to provide a coverage area 24 in the building infrastructure 12. Only the ceilings of the floors 14, 16, 18 are shown in FIG. 2 for simplicity of illustration.

In an example embodiment, the HEU 20 is located within the building infrastructure 12, while in another example embodiment, the HEU 20 may be located outside of the building infrastructure 12 at a remote location. A base transceiver station (BTS) 25, which may be provided by a second party such as a cellular service provider, is connected to the HEU 20, and can be co-located or located remotely from the HEU 20. In a typical cellular system, for example, a plurality of base transceiver stations are deployed at a plurality of remote locations to provide wireless telephone coverage. Each BTS serves a corresponding cell and when a mobile station enters the cell, the BTS communicates with the mobile station. Each BTS can include at least one radio transceiver for enabling communication with one or more subscriber units operating within the associated cell.

A main cable 26 enables multiple fiber optic cables 32 to be distributed throughout the building infrastructure 12 to remote units 30 to provide the coverage area 24 for the first, second and third floors 14, 16, and 18. Each remote unit 30 in turn services its own coverage area in the coverage area 24. The main cable 26 can include a riser cable 28 that carries all of the uplink and downlink fiber optic cables 32 to and from the HEU 20. The main cable 26 can also include one or more multi-cable (MC) connectors adapted to connect select downlink and uplink optical fiber cables to a number of fiber optic cables 32. In this embodiment, an interconnect unit (ICU) 34 is provided for each floor 14, 16, 18, the ICUs 34 including a passive fiber interconnection of optical fiber cable ports. The fiber optic cables 32 can include matching connectors. In an example embodiment, the riser cable 28 includes a total of thirty-six (36) downlink and thirty-six (36) uplink optical fibers, while each of the six (6) fiber optic cables 32 carries six (6) downlink and six (6) uplink optical fibers to service six (6) remote units 30. Each fiber optic cable 32 is in turn connected to a plurality of remote units 30 each having an antenna that provides the overall coverage area 24.

In this example embodiment, the HEUs 20 provide electrical radio-frequency (RF) service signals by passing (or conditioning and then passing) such signals from one or more outside networks 21 to the coverage area 24. The HEUs 20 are electrically coupled to an electrical-to-optical (E/O) converter 38 within the HEU 20 that receives electrical RF service signals from the one or more outside networks 21 and converts them to corresponding optical signals. The optical signals are transported over the riser cables 28 to the ICUs 34. The ICUs 34 include passive fiber interconnection of optical fiber cable ports that pass the optical signals over the fiber optic cables 32 to the remote units 30 to provide the coverage area 24. In an example embodiment, the E/O converter 38 includes a laser suitable for delivering sufficient dynamic range for the RoF applications, and optionally includes a laser driver/amplifier electrically coupled to the laser. Examples of suitable lasers for the E/O converter 38 include laser diodes, distributed feedback (DFB) lasers, Fabry-Perot (FP) lasers, and vertical cavity surface emitting lasers (VCSELs).

The HEUs 20 are adapted to perform or to facilitate any one of a number of RoF applications, including but not limited to radio-frequency identification devices (RFIDs), wireless local area network (WLAN) communications, Bluetooth®, and/or cellular phone services. In a particular example embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. In another example embodiment, the HEUs 20 provide electrical RF service signals by generating the signals directly. In yet another example embodiment, the HEUs 20 coordinate the delivery of the electrical RF service signals between client devices within the coverage area 24.

The number of optical fibers and fiber optic cables 32 can be varied to accommodate different applications, including the addition of second, third, or more HEUs 20. In this example, the RoF distributed communication system 11 incorporates multiple HEUs 20 to provide various types of wireless service to the coverage area 24. The HEUs 20 can be configured in a master/slave arrangement where one HEU 20 is the master and the other HEU 20 is a slave. Also, one or more than two HEUs 20 may be provided depending on desired configurations and the number of coverage area 24 cells desired.

Figure 3:
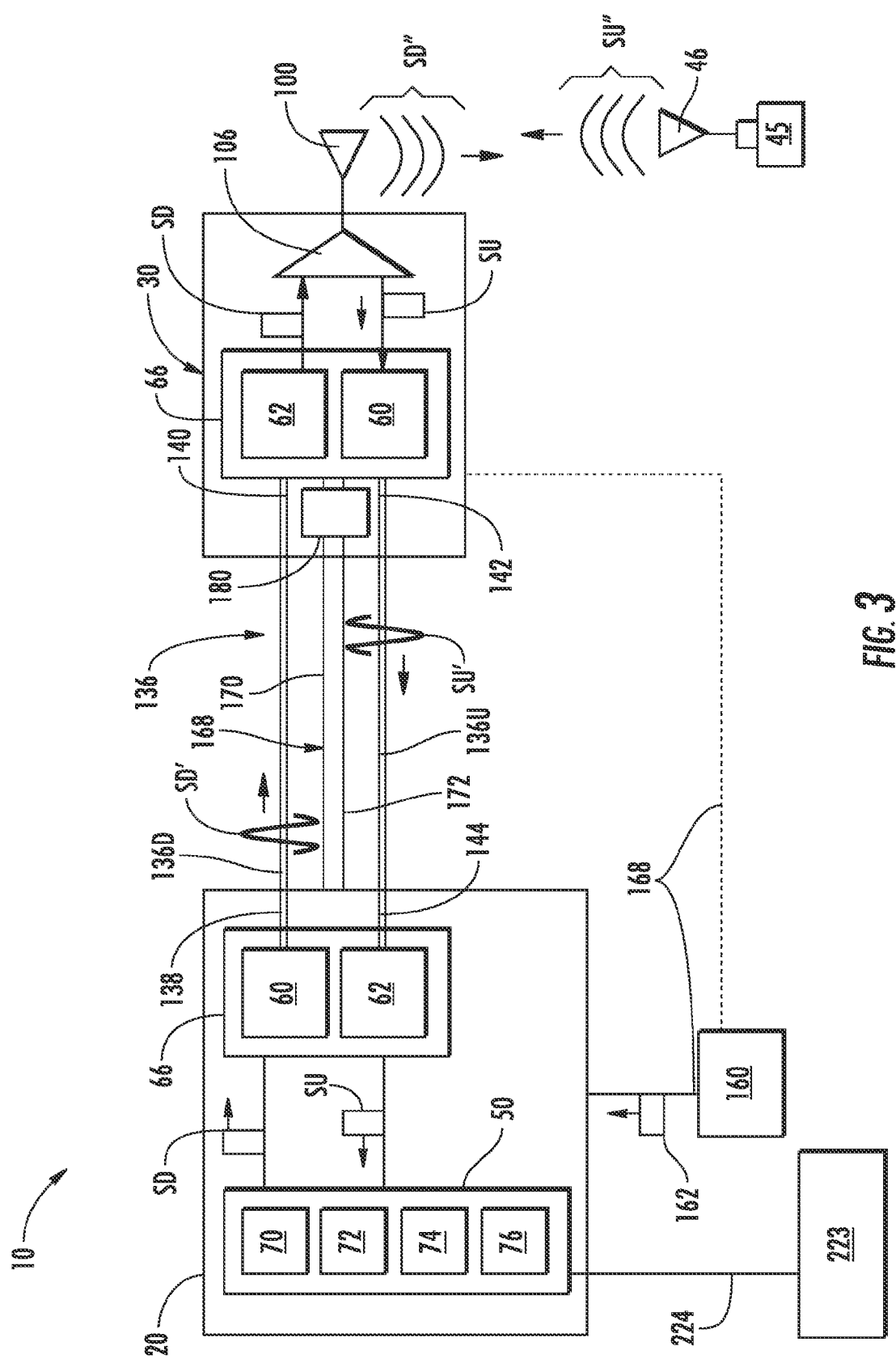
FIG. 3 is a more detailed schematic diagram of an exemplary embodiment of the system of FIG. 1, showing the head-end unit (HEU) and one remote unit and picocell of the exemplary system of FIG. 1.

FIG. 3 is a schematic diagram of an exemplary embodiment of the optical fiber-based wireless picocellular system 10 of FIG. 1. In this exemplary embodiment, the HEU 20 includes a service unit 50 that provides electrical RF service signals for a particular wireless service or application. The service unit 50 provides electrical RF service signals by passing (or conditioning and then passing) such signals from one or more outside networks 223, as described below. In a particular embodiment, this may include providing ultra wide band-impulse response (UWB-IR) signal distribution in the range of 3.1 to 10.6 GHz. Other signal distribution is also possible, including WLAN signal distribution as specified in the IEEE 802.11 standard, i.e., in the frequency range from 2.4 to 2.5 GHz and from 5.0 to 6.0 GHz. In another embodiment, the service unit 50 may provide electrical RF service signals by generating the signals directly.

The service unit 50 is electrically coupled to an E/O converter 60 that receives an electrical RF service signal from the service unit 50 and converts it to corresponding optical signal, as discussed in further detail below. In an exemplary embodiment, the E/O converter 60 includes a laser suitable for delivering sufficient dynamic range for the RF-over-fiber applications, and optionally includes a laser driver/amplifier electrically coupled to the laser. Examples of suitable lasers for the E/O converter 60 include laser diodes, distributed feedback (DFB) lasers, Fabry-Perot (FP) lasers, and vertical cavity surface emitting lasers (VCSELs).

The HEU 20 also includes an O/E converter 62 electrically coupled to the service unit 50. The O/E converter 62 receives an optical RF service signal and converts it to a corresponding electrical signal. In one embodiment, the O/E converter 62 is a photodetector, or a photodetector electrically coupled to a linear amplifier. The E/O converter 60 and the O/E converter 62 constitute a "converter pair" 66.

In an exemplary embodiment, the service unit 50 includes an RF signal modulator/demodulator unit 70 that generates an RF carrier of a given frequency and then modulates RF signals onto the carrier. The modulator/demodulator unit 70 also demodulates received RF signals. The service unit 50 also includes a digital signal processing unit ("digital signal processor") 72, a central processing unit (CPU) 74 for processing data and otherwise performing logic and computing operations, and a memory unit 76 for storing data, such as system settings, status information, RFID tag information, etc. In an exemplary embodiment, the different frequencies associated with the different signal channels are created by the modulator/demodulator unit 70 generating different RF carrier frequencies based on instructions from the CPU 74. Also, as described below, the common frequencies associated with a particular combined picocell are created by the modulator/demodulator unit 70 generating the same RF carrier frequency.

With continuing reference to FIG. 3, in one embodiment, a remote unit 30 includes a converter pair 66, wherein the E/O converter 60 and the O/E converter 62 therein are electrically coupled to an antenna system 100 via an RF signal-directing element 106, such as a circulator. The RF signal-directing element 106 serves to direct the downlink and uplink electrical RF service signals, as discussed below. In an exemplary embodiment, the antenna system 100 includes a broadband (3.1 to 10.6 GHz) antenna integrated into a fiber optic array cable.

The remote units 30 may be a typical access point device, or part of a typical access point device. In one embodiment, the remote units 30 may be typical WLAN access points. In another embodiment, the remote units 30 may be typical broadband access points, or ultra-wide broadband (UWB) access points. In yet another embodiment, the remote units 30 may be co-existent (both WLAN and broadband-UWB) access points. The remote units 30 may be any device capable of forming a picocell or other cellular coverage area substantially centered about the remote unit 30 in which devices within the picocell or other cellular coverage area can communicate with the remote unit 30. In a further embodiment, the remote units 30 differ from the typical access point device associated with wireless communication systems in that the preferred embodiment of the remote unit 30 has just a few signal-conditioning elements and no digital information processing capability. Rather, the information processing capability is located remotely in the HEU 20, and in a particular example, in the service unit 50. This allows the remote unit 30 to be very compact and virtually maintenance free. In addition, the preferred exemplary embodiment of the remote unit 30 consumes very little power, is transparent to RF signals, and does not require a local power source.

With reference again to FIG. 3, an exemplary embodiment of the optical fiber RF communication link 136 includes a downlink optical fiber 136D having a downlink optical fiber input end 138 and a downlink optical fiber output end 140, and an uplink optical fiber 136U having an uplink optical fiber input end 142 and an uplink optical fiber output end 144. The downlink and uplink optical fibers 136D and 136U optically couple the converter pair 66 at the HEU 20 to the converter pair 66 at the remote unit 30. Specifically, the downlink optical fiber input end 138 is optically coupled to the E/O converter 60 of the HEU 20, while the downlink optical fiber output end 140 is optically coupled to the O/E converter 62 at the remote unit 30. Similarly, the uplink optical fiber input end 142 is optically coupled to the E/O converter 60 of the remote unit 30, while the uplink optical fiber output end 144 is optically coupled to the O/E converter 62 at the HEU 20.

In one embodiment, the system 10 employs a known telecommunications wavelength, such as 850 nanometers (nm), 1300 nm, or 1550 nm. In another exemplary embodiment, the system 10 employs other less common but suitable wavelengths such as 980 nm.

Exemplary embodiments of the system 10 include either single-mode optical fiber or multi-mode optical fiber for the downlink and uplink optical fibers 136D and 136U. The particular type of optical fiber depends on the application of the system 10. For many in-building deployment applications, maximum transmission distances typically do not exceed 300 meters. The maximum length for the intended RF-over-fiber transmission needs to be taken into account when considering using multi-mode optical fibers for the downlink and uplink optical fibers 136D and 136U. For example, it has been shown that a 1400 MHz/km multi-mode fiber bandwidth-distance product is sufficient for 5.2 GHz transmission up to 300 m.

In one embodiment, a 50 micrometers ($\mu$m) multi-mode optical fiber is used for the downlink and uplink optical fibers 136D and 136U, and the E/O converters 60 operate at 850 nm using commercially available VCSELs specified for 10 Gigabits per second (Gb/s) data transmission. In a more specific exemplary embodiment, OM3 50 $\mu$m multi-mode optical fiber is used for the downlink and uplink optical fibers 136D and 136U.

The system 10 also includes a power supply 160 that generates an electrical power signal 162. The power supply 160 is electrically coupled to the HEU 20 for powering the power-consuming elements therein. In one embodiment, an electrical power line 168 runs through the HEU 20 and over to the remote unit 30 to power the E/O converter 60 and the O/E converter 62 in the converter pair 66, the optional RF signal-directing element 106 (unless the optional RF signal-directing element 106 is a passive device such as a circulator), and any other power-consuming elements (not shown). In an exemplary embodiment, the electrical power line 168 includes two wires 170 and 172 that carry a single voltage and that are electrically coupled to a DC power converter 180 at the remote unit 30. The DC power converter 180 is electrically coupled to the E/O converter 60 and the O/E converter 62 in the remote unit 30, and changes the voltage or levels of the electrical power signal 162 to the power level(s) required by the power-consuming components in the remote unit 30. In one embodiment, the DC power converter 180 is either a DC/DC power converter or an AC/DC power converter, depending on the type of electrical power signal 162 carried by the electrical power line 168. In an exemplary embodiment, the electrical power line 168 includes standard electrical-power-carrying electrical wire(s), e.g., 18-26 AWG (American Wire Gauge) used in standard telecommunications and other applications. In another exemplary embodiment, the electrical power line 168 (shown as a dashed line in FIG. 3) runs directly from the power supply 160 to the remote unit 30 rather than from or through the HEU 20. In another exemplary embodiment, the electrical power line 168 includes more than two wires and carries multiple voltages.

In another embodiment, the HEU 20 is operably coupled to the outside networks 223 via a network link 224.

With reference to the optical-fiber-based wireless picocellular system 10 of FIGS. 1 and 3, the service unit 50 generates an electrical downlink RF service signal SD ("electrical signal SD") corresponding to its particular application. In one embodiment, this is accomplished by the digital signal processor 72 providing the modulator/demodulator unit 70 with an electrical signal (not shown) that is modulated onto an RF carrier to generate a desired electrical signal SD. The electrical signal SD is received by the E/O converter 60, which converts this electrical signal SD into a corresponding optical downlink RF signal SD' ("optical signal SD'"), which is then coupled into the downlink optical fiber 136D at the input end 138. It is noted here that in one embodiment, the optical signal SD' is tailored to have a given modulation index. Further, in an exemplary embodiment, the modulation power of the E/O converter 60 is controlled (e.g., by one or more gain-control amplifiers, not shown) to vary the transmission power from the antenna system 100. In an exemplary embodiment, the amount of power provided to the antenna system 100 is varied to define the size of the associated picocell 40, which in exemplary embodiments range anywhere from about a meter across to about twenty meters across.

The optical signal SD' travels over the downlink optical fiber 136D to the output end 140, where it is received by the O/E converter 62 in the remote unit 30. The O/E converter 62 converts the optical signal SD' back into an electrical signal SD, which then travels to the RF signal-directing element 106. The RF signal-directing element 106 then directs the electrical signal SD to the antenna system 100. The electrical signal SD is fed to the antenna system 100, causing it to radiate a corresponding electromagnetic downlink RF signal SD" ("electromagnetic signal SD").

When the device 45 is located within the picocell 40, the electromagnetic signal SD" is received by the antenna 46. The antenna 46 converts the electromagnetic signal SD" into an electrical signal SD in the device 45, and processes the electrical signal SD. The device 45 can generate electrical uplink RF signals SU, which are converted into electromagnetic uplink RF signals SU" ("electromagnetic signal SU"") by the antenna 46.

When the device 45 is located within the picocell 40, the electromagnetic signal SU" is detected by the antenna system 100 in the remote unit 30, which converts the electromagnetic signal SU" back into an electrical signal SU. The electrical signal SU is directed by the RF signal-directing element 106 to the E/O converter 60 in the remote unit 30, which converts this electrical signal into a corresponding optical uplink RF signal SU' ("optical signal SU'"), which is then coupled into the input end 142 of the uplink optical fiber 136U. The optical signal SU' travels over the uplink optical fiber 136U to the output end 144, where it is received by the O/E converter 62 at the HEU 20. The O/E converter 62 converts the optical signal SU' back into an electrical signal SU, which is then directed to the service unit 50. The service unit 50 receives and processes the electrical signal SU, which in one embodiment includes one or more of the following: storing the signal information; digitally processing or conditioning the signals; sending the signals on to one or more outside networks 223 via network links 224; and sending the signals to one or more devices 45 in the picocellular coverage area 44. In an exemplary embodiment, the processing of the electrical signal SU includes demodulating the electrical signal SU in the modulator/demodulator unit 70, and then processing the demodulated signal in the digital signal processor 72.

Figure 4:
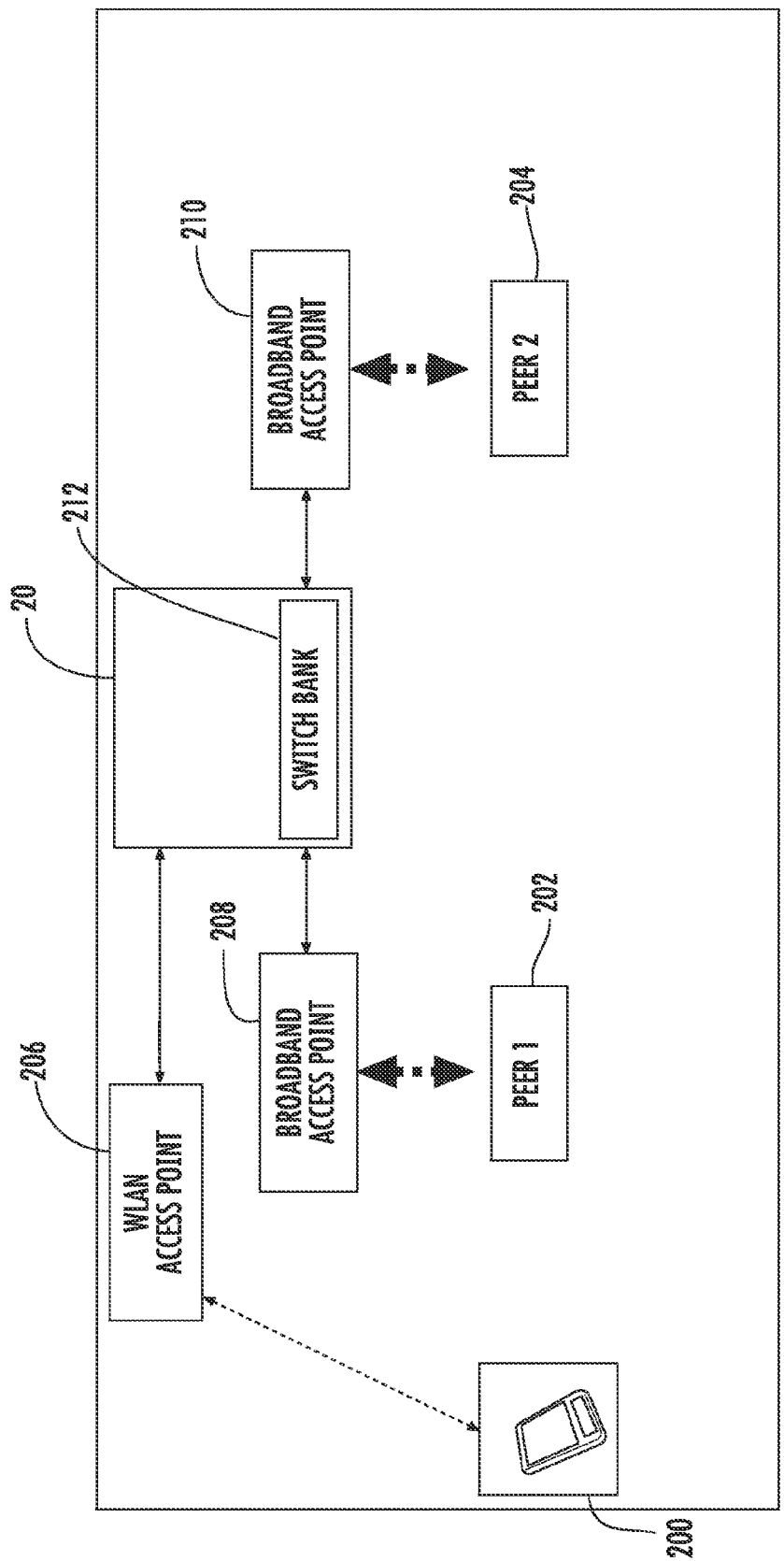
FIG. 4 is a schematic diagram of using an exemplary embodiment of an optically-switched fiber optic wired and/or wireless ("wired/wireless") communication system to allow proprietary protocol data transfer between peer-to-peer devices according to an exemplary embodiment.
Figure 5:
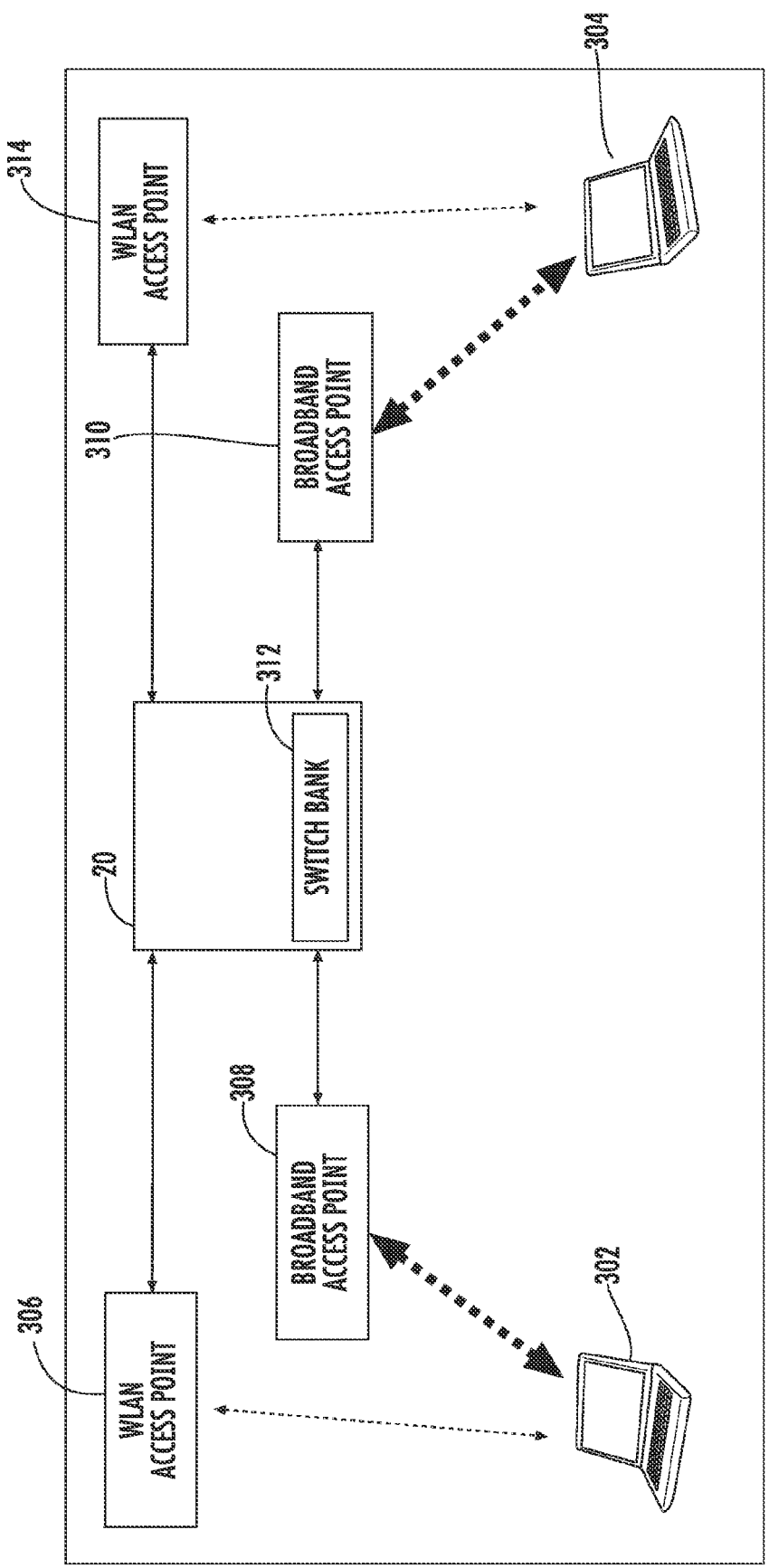
FIG. 5 is a schematic diagram of using an exemplary embodiment of an optically-switched fiber optic wired/wireless communication system to allow videoconferencing between peer-to-peer devices according to an exemplary embodiment.
Figure 6:
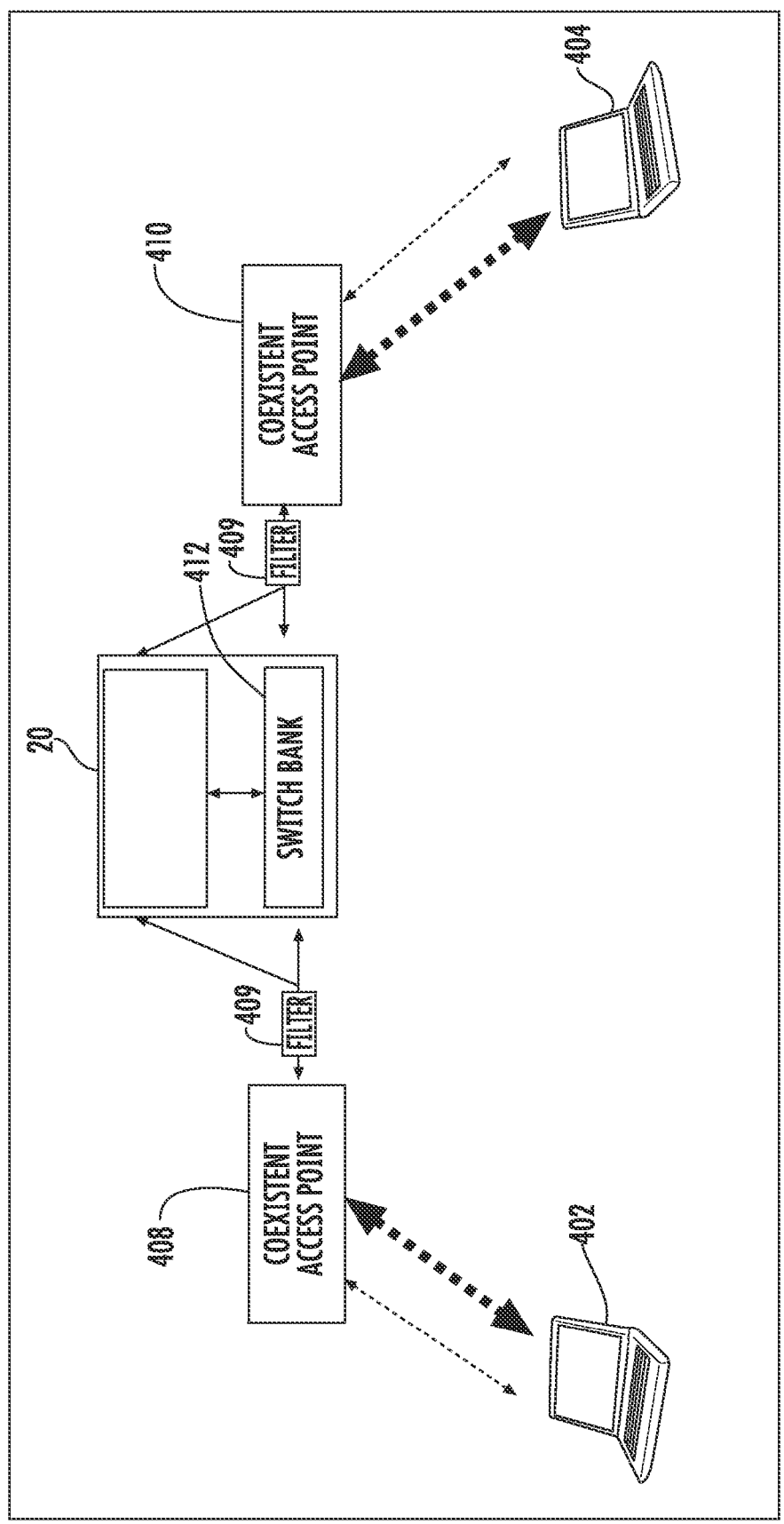
FIG. 6 is a schematic diagram of using an exemplary embodiment of an optically-switched fiber optic wired/wireless communication system to allow communication between peer-to-peer devices through co-existent access points according to an exemplary embodiment.

FIGS. 4-6 illustrate three embodiments of protocol-independent RoF wireless presence. All of these embodiments have a WLAN-requesting switching network to initiate a protocol-independent peer-to-peer connection.

FIG. 4 is a schematic diagram of using an exemplary embodiment of an optically-switched fiber optic wired/wireless communication system to allow proprietary protocol data transfer between peer-to-peer devices according to an exemplary embodiment. In FIG. 4, a peer device 202 is located in a different cellular coverage area ("cell") than a peer device 204. The peer device 202 is capable of communicating with an access point 208 through a wireless connection (indicated by the dashed line) when the peer device 202 is within a first cell defined by the access point 208. The peer device 204 is capable of communicating with an access point 210 through a wireless connection (indicated by the dashed line) when the peer device 204 is within a second cell defined by the access point 210. The access points 208 and 210 may be broadband access points, or broadband transponders. In one embodiment, the access points 208 and 210 may be similar to the remote units 30 described above with respect to FIG. 3, where the remote units 30 include a converter pair 66, wherein the E/O converter 60 and the O/E converter 62 therein are electrically coupled to an antenna system 100 via an RF signal-directing element 106, such as a circulator.

The access points 208 and 210 are optically coupled to a HEU 20 by optical fibers in a fiber optic cable (as represented by the solid lines between the access points 208 and 210 and the HEU 20). In one embodiment, the optical fibers may connect the access points 208 and 210 to the HEU 20 in a manner similar to that illustrated in FIGS. 2 and/or 3. FIG. 4 illustrates using a device 200 (e.g., PDA or cellular telephone) that is different than the peer device 202 to request the peer-to-peer switching. The device 200 sends a peer-to-peer request to a WLAN access point 206 (as indicated by the dashed line). The WLAN access point 206 is also optically coupled to the HEU 20 by optical fibers in a fiber optic cable (as represented by the solid lines between the WLAN access point 206 and the HEU 20) such that the peer-to-peer request is sent from the WLAN access point 206 to the HEU 20.

When the HEU 20 receives the peer-to-peer request, an optical switch bank 212 dynamically selects the appropriate optical fibers to connect the access points 208 and 210 so that the peer devices 202 and 204 associated with the access points 208 and 210 can communicate with each other. Once the optical switch bank 212 dynamically selects the appropriate optical fibers to connect the access points 208 and 210, the peer device 202 can communicate wirelessly with the access point 208 using whatever protocol the peer device 202 and the access point 208 are capable of using, and the peer device 204 can communicate wirelessly with the access point 210 using whatever protocol the peer device 204 and the access point 210 are capable of using. In this manner, peer-to-peer communication between the peer devices 202 and 204 in different cells using different wireless protocols is enabled through the optical switch bank 212 establishing a dynamic optical link between the access points 208 and 210 of the two different cells.

This scenario could be used in medical applications such as a hospital or other medical facility, where a doctor using a PDA might request that high resolution images (X-ray, MRI, etc.) stored on remote proprietary devices be displayed on a bedside proprietary-protocol-based monitor. For example, the peer device 202 could have be a computer in a hospital records area that has X-ray data stored on it. Through the use of the system shown in FIG. 4, the data from the peer device 202 could be transmitted to the peer device 204, which might be a computer terminal or other monitor or display in a patient's room that is on a different floor from the records room where the peer device 202 is located.

FIG. 5 is a schematic diagram of using an exemplary embodiment of an optically-switched fiber optic wired/wireless communication system to allow videoconferencing between peer-to-peer devices according to an exemplary embodiment. In FIG. 5, a peer device 302 is located in a different cell than a peer device 304. The peer device 302 is capable of communicating with an access point 308 through a wireless connection (indicated by the dashed line) when the peer device 302 is within a first cell defined by the access point 308. The peer device 304 is capable of communicating with an access point 310 through a wireless connection (indicated by the dashed line) when the peer device 304 is within a second cell defined by the access point 310. The access points 308 and 310 may be broadband access points, or broadband transponders. In one embodiment, the access points 308 and 310 may be similar to the remote units 30 described above with respect to FIG. 3, where the remote units 30 include a converter pair 66, wherein the E/O converter 60 and the O/E converter 62 therein are electrically coupled to an antenna system 100 via an RF signal-directing element 106, such as a circulator.

The access points 308 and 310 are optically coupled to a HEU 20 by optical fibers in a fiber optic cable (as represented by the solid lines between the access points 308 and 310 and the HEU 20). In one embodiment, the optical fibers may connect the access points 308 and 310 to the HEU 20 in a manner similar to that illustrated in FIGS. 2 and/or 3. The exemplary system shown in FIG. 5 works in a similar manner as that shown in FIG. 4. The scenario illustrated in FIG. 5 differs from that of FIG. 4 in that one of the peer devices 302 or 304 initiates the connection, instead of requiring a different device (e.g., PDA). This is applicable in situations where the peer devices 302 and 304 both have WLAN access and a broadband wireless (possibly proprietary-protocol) network and desire to participate in a videoconference. Thus, in one embodiment, the peer devices 302 and 304 may be computing devices, such as laptop computers, the access points 308 and 310 may be broadband access points, and the access points 306 and 314 may be WLAN access points. For example, the embodiment of FIG. 5 could utilize an existing low data rate WLAN that is insufficient for a video application (e.g., 802.11b) by allowing a laptop computer to place the request for a peer-to-peer connection on the low data rate network, and have the video information transferred via a peer-to-peer broadband higher data rate network based on wireless/UWB USB. Thus, in FIG. 5, one of the peer devices 302 or 304 initiates a request for peer-to-peer communication. The peer device 302 sends a communication request to the WLAN access point 306 or the peer device 304 sends a communication request to the WLAN access point 314 (as indicated by the thin dashed lines). The WLAN access points 306 and 314 are optically coupled to the HEU 20 by optical fibers in a fiber optic cable (as represented by the solid lines between WLAN access point 306 and the HEU 20 and between the WLAN access point 314 and the HEU 20) such that the peer-to-peer request is sent from either the WLAN access point 306 or the WLAN access point 314 to the HEU 20.

When the HEU 20 receives the peer-to-peer request, an optical switch bank 312 dynamically selects the appropriate optical fibers to connect the access points 308 and 310 so that the peer devices 302 and 304 associated with the access points 308 and 310 can communicate with each other. Once the optical switch bank 312 dynamically selects the appropriate optical fibers to connect the access points 308 and 310, the peer device 302 can communicate wirelessly with the access point 308 using whatever protocol the peer device 302 and the access point 308 are capable of using, and the peer device 304 can communicate wirelessly with the access point 310 using whatever protocol the peer device 304 and the access point 310 are capable of using. In this manner, peer-to-peer communication between the peer devices 302 and 304 in different cells using different wireless protocols is enabled through the switch bank 312 establishing a dynamic optical link between the access points 308 and 310 of the two different cells.

FIG. 6 is a schematic diagram of using an exemplary embodiment of an optically-switched fiber optic wired/wireless communication system to allow communication between peer-to-peer devices through co-existent access points according to an exemplary embodiment. In FIG. 6, a peer device 402 is located in a different cell than a peer device 404. The peer device 402 is capable of communicating with an access point 408 through a wireless connection (indicated by the thin dashed line on the left) when the peer device 402 is within a first cell defined by the access point 408. The peer device 404 is capable of communicating with an access point 410 through a wireless connection (indicated by the thin dashed line on the right) when the peer device 404 is within a second cell defined by the access point 410. The access points 408 and 410 may be coexistent access points. In one-embodiment, the access points 408 and 410 may have both WLAN and broadband (e.g. broadband-UWB) capabilities. The access points 408 and 410 are optically coupled to a HEU 20 by optical fibers in a fiber optic cable (as represented by the solid lines between the access points 408 and 410 and the HEU 20). In the embodiment where access point 408 is a coexistent access point, a filter 409 may be used to separate broadband signals, such as 2.4 Megahertz signals, from WLAN signals, such as 802.11 signals, that may be received over the fiber optic cable from the coexistent access point 408. In the embodiment where access point 410 is a coexistent access point, a filter 411 may be used to separate broadband signals, such as 2.4 Megahertz signals, from WLAN signals, such as 802.11 signals, that may be received over the fiber optic cable from the coexistent access point 410. In one embodiment, the HEU 20 automatically determines that communication between the peer devices 402 and 404 are possible based on the frequency of the signals received from the peer devices 402 and 404. In one embodiment, the HEU 20 may sense the radio frequency band content of the signals received from the peer devices 402 and 404, with one peer device being located in each cell. The HEU 20 may then automatically determine a switch configuration by using the optical switch bank 412 to connect the cells that have common radio frequency bands via a RoF-based optical link. This automatic connection eliminates the need for a peer-to-peer request from one of the peer devices 402 or 404, or from a third device. In one embodiment, the optical fibers may connect the access points 408 and 410 to the HEU 20 in a manner similar to that illustrated in FIGS. 2 and/or 3. The exemplary system shown in FIG. 6 works in a similar manner as that shown in FIGS. 4 and 5. The scenario illustrated in FIG. 6 differs from that of FIG. 5 in that only one network with coexistent capabilities is used in place of two separate networks, and that the broadband signals may be filtered from the WLAN signals. For example, the videoconferencing application example mentioned with respect to FIG. 5 would also be suitable in FIG. 6.

When the HEU 20 receives the peer-to-peer request from either peer device 402 or 404 through the access point 408 or 410, a switch bank 412 dynamically selects the appropriate optical fibers to connect the access points 408 and 410 so that the peer devices 402 and 404 associated with the access points 408 and 410 can communicate with each other. Once the switch bank 412 dynamically selects the appropriate optical fibers to connect the access points 408 and 410, the peer device 402 can communicate wirelessly with the access point 408 independent of protocol. In this manner, peer-to-peer communication between the peer devices 402 and 404 in different cells using different wireless protocols is enabled through the switch bank 412 establishing a dynamic optical link between the access points 408 and 410 of the two different cells.

Figure 7:
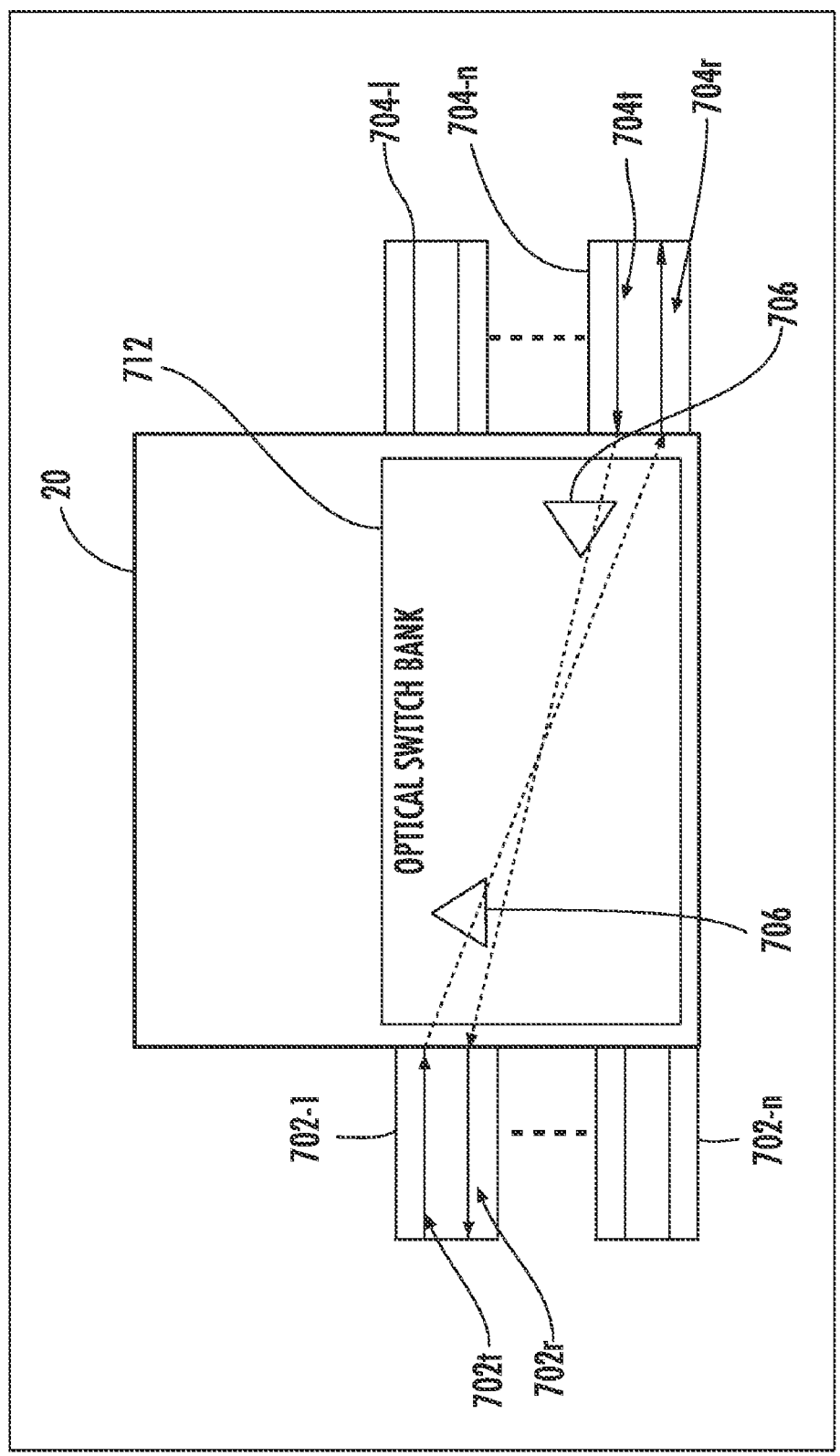
FIG. 7 is a schematic diagram of an exemplary embodiment of an optical switching bank at a HEU of an optically-switched fiber optic wired/wireless communication system.

FIG. 7 is a schematic diagram of an exemplary embodiment of an optical switching bank at a HEU of an optically-switched fiber optic wired/wireless communication system. In FIG. 7, fiber optic cables 702-1 through 702-n and 704-1 through 704-n optically couple the HEU 20 to the access point(s) of N peer devices. For example, the fiber optic cable 702-1 optically couples the HEU 20 to the access point of Peer 1 and fiber optic cable 704-n optically couples the HEU 20 to the access point of Peer N. In one embodiment, each fiber optic cable 702-1 through 702-n and 704-1 through 704-n has a transmit optical fiber and a receive optical fiber. For example, the fiber optic cable 702-1 has an optical transmit fiber 702t and an optical receive fiber 702r, and the fiber optic cable 704-n has an optical transmit fiber 704t and an optical receive fiber 704r. Thus, FIG. 7 illustrates how when a request for Peer 1 to communicate with Peer N is received at the HEU 20, an optical switch bank 712 will dynamically link the two cells where Peer 1 and Peer N are located by coupling the optical transmit fiber 702t and the optical receive fiber 702r associated with Peer 1 to the optical receive fiber 704r and the optical transmit fiber 704t associated with Peer N. In one embodiment, the HEU 20 may include optical amplifiers 706. In one embodiment, the optical amplifiers 706 may be added when it is desired to be able to enable communication between peer devices that are more than 300 meters apart.

FIG. 8 is a schematic diagram of an exemplary embodiment of using optical amplification and splitting at a HEU of an optically-switched fiber optic wired/wireless communication system for broadcasting video to peer-to-peer devices. In FIG. 8, an incoming fiber optic cable 802 couples a device that provides a video source (not shown) to the HEU 20. The fiber optic cable 802 may include an optical transmit fiber 802t and an optical receive fiber 802r in one embodiment. The HEU 20 of FIG. 8 includes a video broadcasting unit 806 that splits the video coming in over the optical transmit fiber 802t to multiple outgoing fiber optic cables 804-1 to 804-n, each of which may be optically coupled to a peer device. Each fiber optic cable 804-1 through 804-n has a transmit and a receive optical fiber. For example, the fiber optic cable 804-1 has an optical transmit fiber 804-1t and an optical receive fiber 804-1r, and the fiber optic cable 804-n has an optical transmit fiber 804-nt and an optical receive fiber 804nr. Thus, FIG. 8 illustrates how a HEU 20 that is optically coupled to a video source may broadcast video (e.g., high-definition (HD) TV (HDTV), videoconferencing, etc.) over optical fibers to multiple peer devices in different locations. In one embodiment, the video broadcasting unit 806 may also provide amplification of the video signal. Note that in certain embodiments of the video broadcasting embodiment of FIG. 8, not all of the optical transmit and receive fibers need be used. For example, the optical transmit fiber 802t of the fiber optic cable 802, as well as the optical transmit fibers 804-1t through 804-nt, are not necessarily used when a video signal is broadcast using the embodiment of FIG. 8.

FIG. 9 is a schematic diagram of an exemplary embodiment of an optically-switched fiber optic wired/wireless communication system that illustrates an exemplary connection between a HEU and broadband transponders in two different locations. In FIG. 9, the HEU 20 is optically coupled to broadband transponders 906 and 914, which may be in different cellular coverage areas. Each of the broadband transponders 906 and 914 is optically coupled to the HEU 20 via a fiber optic cable 900, which has an electrical power line 902 and one or more optical fibers 904. The broadband transponder 906 has an RF input/output 908, which in one embodiment is an RF antenna, a DC input/output 910, and an optical input/output 912. The broadband transponder 914 has an RF input/output 916, which in one embodiment is an RF antenna, a DC input/output 918, and an optical input/output 920.

Figure 10:
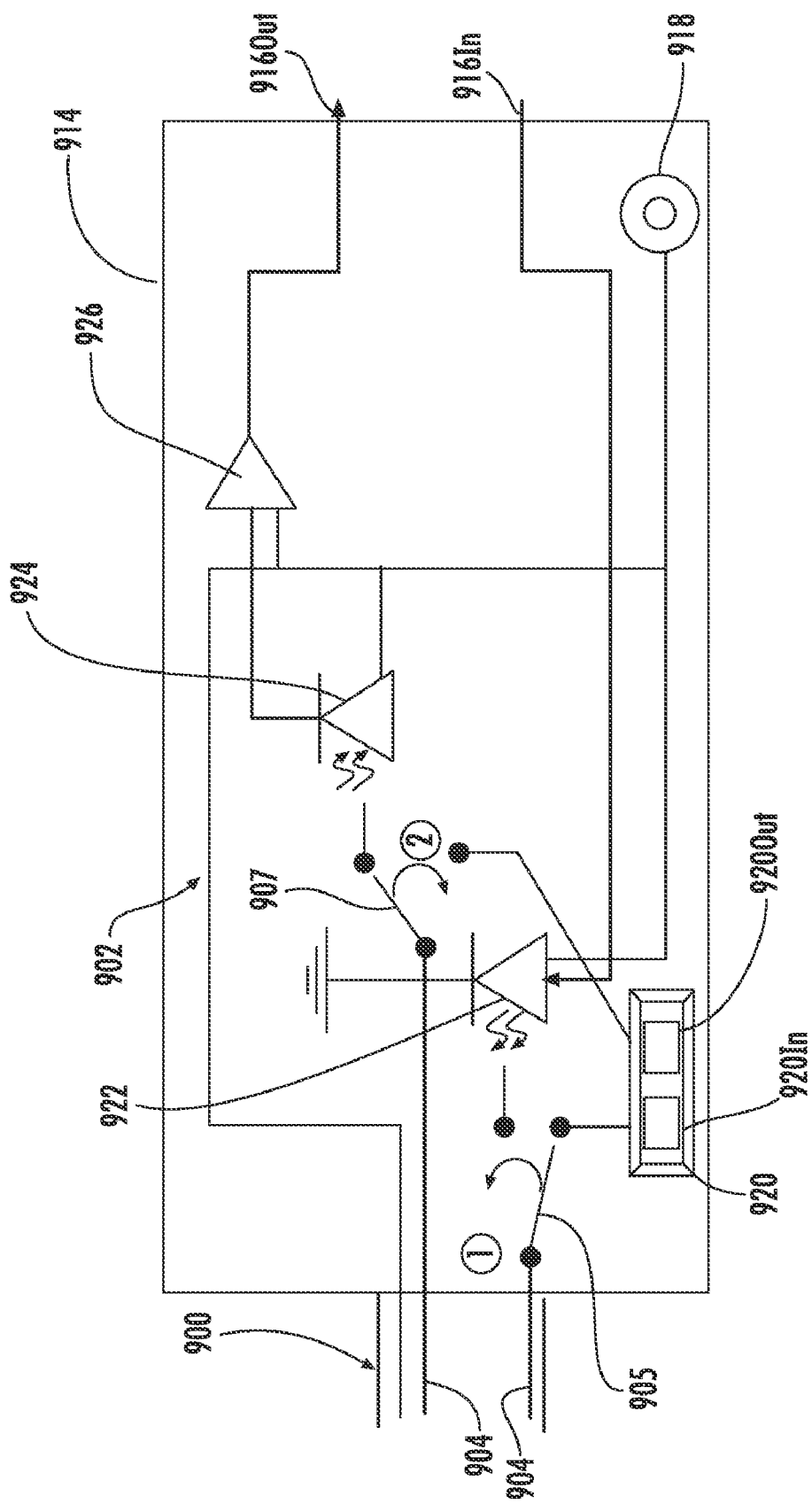
FIG. 10 is a schematic diagram of an exemplary embodiment of a broadband transponder that may be used in an exemplary embodiment of an optically-switched fiber optic wired/wireless communication system.

FIG. 10 is a schematic diagram of an exemplary embodiment of a broadband transponder that may be used in an exemplary embodiment of an optically-switched fiber optic wired/wireless communication system. FIG. 10 shows one embodiment of the broadband transponder 914 from FIG. 9 with more internal details. The broadband transponder 906 in FIG. 9 may be similar to the broadband transponder 914. The fiber optic cable 900 having the electrical power line 902 and optical fibers 904 optically couples the broadband transponder 914 to the HEU 20 (as shown in FIG. 9). The broadband transponder 914 may have an RF input/output 916In and 916Out, which in one embodiment is an RF antenna, a DC input/output 918, and an optical input/output 920In and 920Out. In one embodiment, the broadband transponder 914 may also include a laser diode 922, a photo detector 924, and a transimpedance amplifier 926. In one embodiment, optical switches 905 and 907 enable selections between the RF input/output 916In and 916Out and the optical input/output 920In and 920Out.

Figure 11:
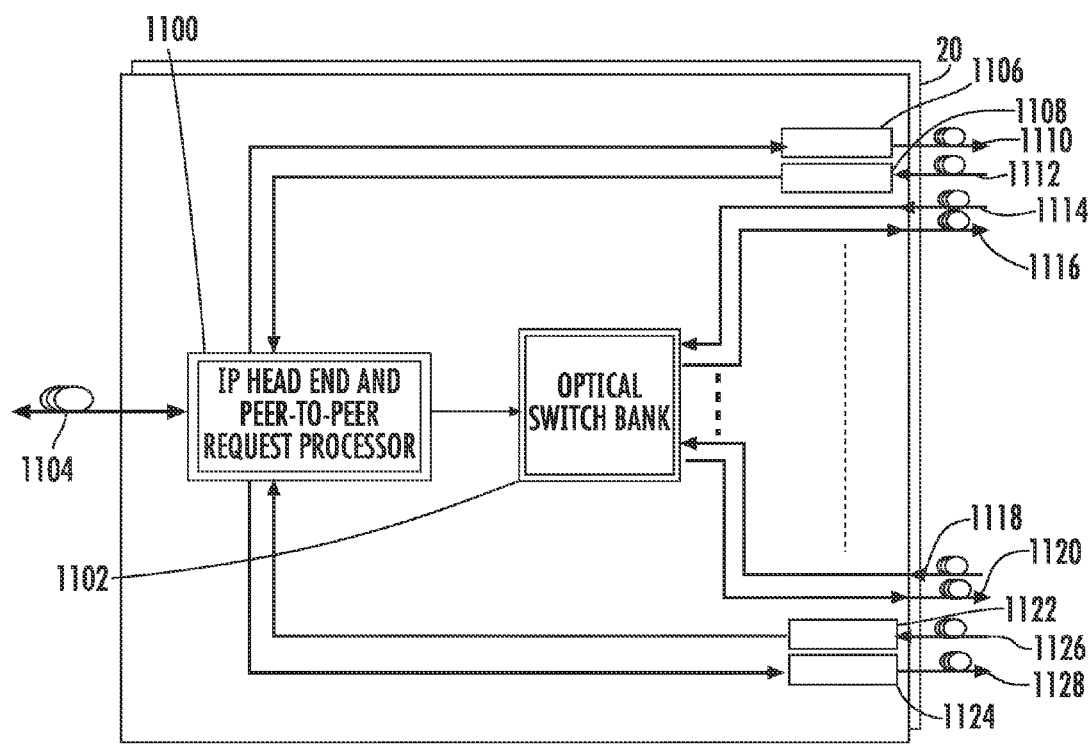
FIG. 11 is a schematic diagram of an exemplary embodiment of a HEU of an optically-switched fiber optic wired/wireless communication system.

FIG. 11 is a schematic diagram of an exemplary embodiment of a HEU of an optically-switched fiber optic wired/wireless communication system. FIG. 11 illustrates the details of an exemplary HEU that can enable communication between peer devices in N cellular coverage areas. The HEU 20 shown in FIG. 11 could be used in the exemplary embodiment of an optically-switched fiber optic wired/wireless communication system shown in FIG. 5. The HEU 20 of FIG. 11 includes a peer-to-peer request processor 1100 and optical switch bank 1102. The peer-to-peer request processor 1100 handles the requests for communication that are received from the peer devices. Together, the peer-to-peer request processor 1100 and the optical switch bank 1102 are able to provide the high bandwidth peer-to-peer connection between peer devices in different cellular coverage areas independent of protocol. The HEU 20 can receive or transmit signals to external networks over optical fiber 1104. A transmit optical fiber 1110 and a receive optical fiber 1112 optically couple the HEU 20 to a WLAN access point or transponder for a first peer device in a first cellular coverage area. An E/O converter unit 1106 and an O/E converter unit 1108 provide any necessary E/O or O/E conversion. A receive optical fiber 1114 and a transmit optical fiber 1116 optically couple the HEU 20 to the broadband access point or transponder for the first peer device. A receive optical fiber 1118 and a transmit optical fiber 1120 optically couple the HEU 20 to a broadband access point or transponder for a second peer device in a second cellular coverage area. A receive optical fiber 1126 and a transmit optical fiber 1128 optically couple the HEU 20 to a WLAN access point or transponder for the second peer device. An O/E converter unit 1122 and an E/O converter unit 1124 provide any necessary E/O or O/E conversion. It is to be understood that there may be additional sets of optical fibers if there are more than two peer devices.

Figure 12:
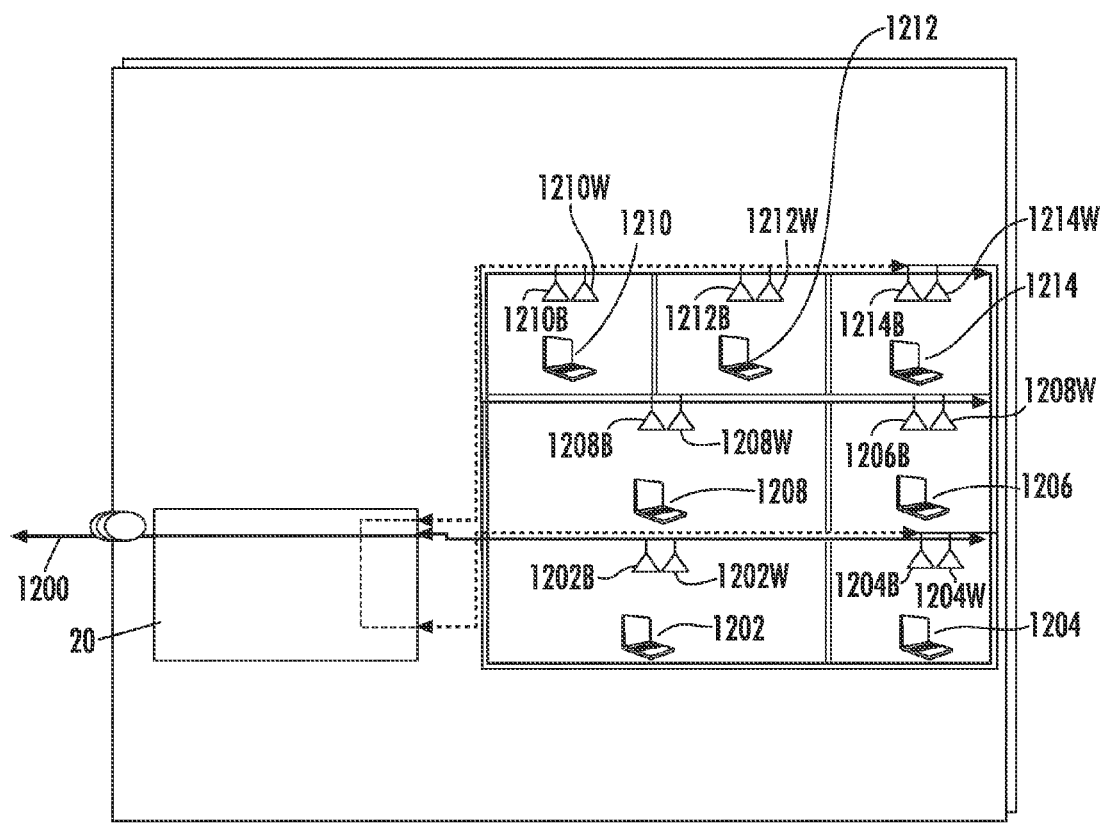
FIG. 12 is a schematic diagram of an exemplary embodiment of a Radio-over-Fiber based wireless communication system.

FIG. 12 is a schematic diagram of an exemplary embodiment of a RoF-based wireless presence communication system. FIG. 12 shows one embodiment of how the RoF-based wireless presence communication system might be implemented. Each of a plurality of peer devices 1202, 1204, 1206, 1208, 1210, 1212, and 1214 is in a different cellular coverage area. They may be in different rooms in a building, or even on different floors in a building. In one embodiment, each of a plurality of peer devices 1202, 1204, 1206, 1208, 1210, 1212, and 1214 is located such that it may be capable of communicating wirelessly via both a broadband transponder and a wireless transponder, such as a WLAN, WiMax, or cellular transponder. For example, the peer device 1202 is located such that it may be located in a cellular coverage area defined by a broadband transponder 1202B and a wireless transponder 1202W such that peer device 1202 may be capable of communicating wirelessly via both the broadband transponder 1202B and the wireless transponder 1202W. Each of the other peer devices 1204, 1206, 1208, 1210, 1212, and 1214 is also associated with a broadband transponder and a WLAN transponder such that each of the other 1204, 1206, 1208, 1210, 1212, and 1214 may be capable of communicating wirelessly via both a broadband transponder and a wireless transponder. The solid lines indicate a typical RoF wireless deployment and the dotted lines indicate the peer-to-peer fiber connection through the nearly protocol-transparent RoF technology by using the optically-switched fiber optic wired/wireless communication system disclosed herein. The typical RoF wireless deployment connects the various rooms or cells to external networks over optical fiber 1200, whereas the optically-switched fiber optic wired/wireless communication system disclosed herein, as shown by the dotted lines, allows room-to-room, or cell-to-cell, communication between devices in different cellular coverage areas, or between devices in the same cellular coverage area that use different communication protocols.

Thus, by using an optically-switched RoF wired/wireless communication system, the communication range of peer-to-peer communication systems may be increased. By using an optical switch bank in a HEU to set up a dynamic link between the transponders in two different cells, the devices in the two different cells can communicate with each other over the optical fibers through the HEU. This system overcomes the limitations of traditional wired/wireless peer-to-peer communications by combining the low loss, high bandwidth nature of optical fiber with an appropriate optical switching network to enhance coverage (where needed). By taking advantage of the fiber cable architecture of the optically-switched fiber optic wired/wireless communication system, such as a RoF WLAN picocell system, the peer-to-peer communication range is extended to be cell-to-cell. This means that devices in any two cells can communicate in the peer-to-peer mode independent of their physical distance, such that the peer-to-peer range extends across entire indoor installation areas. In addition, the optically-switched fiber optic wired/wireless communication system disclosed herein uses optical cable links that are nearly transparent to wireless protocols, thereby eliminating proprietary protocol compliance requirements.

Further, as used herein, it is intended that the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover any modifications and variations of the embodiments provided they come within the scope of the appended claims and their equivalents. Although specific terms are employed herein, they are used in a generic and descriptive sense only and not for purposes of limitation.

What is claimed is:

1. An optical fiber-based wireless communication system, comprising:
   a head-end unit (HEU) having an optical switch bank; and
   a plurality of fiber optic cables each comprising at least one optical fiber and configured to carry a Radio-over-Fiber (RoF) signal from the HEU to a plurality of remote access points, wherein a first one of the plurality of remote access points is configured to form a corresponding first coverage area, and a second one of the plurality of remote access points is configured to form a corresponding second, different coverage area,
   wherein the optical switch bank is configured to dynamically establish a RoF-based optical link over at least one of the plurality of fiber optic cables such that a first peer device in the first coverage area can communicate with a second peer device in the second coverage area at least in part over the RoF-based optical link, and
   wherein the HEU is further configured to receive a request from a first one of the first and second peer devices to communicate with a second one of the first and second peer devices via at least one Wireless Local Area Network (WLAN) access point associated with at least one of the first and second peer devices.

2. The optical fiber-based wireless communication system of claim 1, wherein the first one of the plurality of remote access points is configured to wirelessly communicate with the first peer device; and
   the second one of the plurality of remote access points is configured to wirelessly communicate with the second peer device.

3. The optical fiber-based wireless communication system of claim 1, wherein the first and second ones of the plurality of remote access points are broadband access points.

4. The optical fiber-based wireless communication system of claim 1, wherein the HEU is further configured to automatically establish the RoF-based optical link between the first coverage area and the second coverage area when signals received at the HEU from the first peer device in the first coverage area and signals received from the second peer device in the second coverage area have common radio frequencies.

5. The optical fiber-based wireless communication system of claim 1, wherein the HEU is optically coupled to the at least one WLAN access point via a fiber optic cable comprising at least one optical fiber.

6. The optical fiber-based wireless communication system of claim 1, wherein the first one of the plurality of remote access points is configured to wirelessly communicate with the first peer device using a different wireless communication protocol than a protocol used by the second one of the plurality of remote access points to wirelessly communicate with the second peer device.

7. The optical fiber-based wireless communication system of claim 6, wherein at least one of the wireless communication protocols used by the first one or second one of the plurality of remote access points to wirelessly communicate with the first or second peer device is a proprietary wireless communication protocol.

8. The optical fiber-based wireless communication system of claim 1, wherein the optical switch bank further comprises at least one optical amplifier.

9. The optical fiber-based wireless communication system of claim 1, wherein the HEU further comprises a video broadcast unit configured to split a video signal received at the HEU to a plurality of devices over a plurality of fiber optic cables comprising at least one optical fiber.

10. The optical fiber-based wireless communication system of claim 1, wherein at least one of the plurality of remote access units further comprises at least one of a radio frequency (RF) input/output, a DC input/output, and an optical input/output.

11. The optical fiber-based wireless communication system of claim 10, wherein at least one of the plurality of remote access units further comprises at least one of a laser diode, a photo detector, a transimpedance amplifier, and at least one switch configured to selectively connect at least one optical fiber to either the RF input/output and/or the optical input/output.

12. The optical fiber-based wireless communication system of claim 1, further comprising a processor in the HEU configured to process requests for peer-to-peer communication between the first and second peer devices.

13. The optical fiber-based wireless communication system of claim 1, wherein the RoF-based optical link is all optical.

14. An optical fiber-based wireless communication system, comprising:
a head-end unit (HEU) having an optical switch bank; and
a plurality of fiber optic cables each comprising at least one optical fiber and configured to carry a Radio-over-Fiber (RoF) signal from the HEU to a plurality of remote access points, wherein a first one of the plurality of remote access points is configured to form a corresponding first coverage area, and a second one of the plurality of remote access points is configured to form a corresponding second, different coverage area,
wherein the optical switch bank is configured to dynamically establish a RoF-based optical link over at least one of the plurality of fiber optic cables such that a first peer device in the first coverage area can communicate with a second peer device in the second coverage area at least in part over the RoF-based optical link, and
wherein at least one of the first and second ones of the plurality of remote access points is a coexistent access point configured to communicate via both Wireless Local Area Network (WLAN) and broadband signals.

15. The optical fiber-based wireless communication system of claim 14, wherein the at least one coexistent access point is optically coupled to the HEU via a fiber optic cable comprising at least one optical fiber.

16. The optical fiber-based wireless communication system of claim 14, wherein the RoF-based optical link is all optical.

17. The optical fiber-based wireless communication system of claim 14, wherein at least one of the plurality of remote access units further comprises at least one of a radio frequency (RF) input/output, a DC input/output, and an optical input/output.

18. An optical fiber-based wireless communication system, comprising:
a head-end unit (HEU) having an optical switch bank; and
a plurality of fiber optic cables each comprising at least one optical fiber and configured to carry a Radio-over-Fiber (RoF) signal from the HEU to a plurality of remote access points, wherein a first one of the plurality of remote access points is configured to form a corresponding first coverage area, and a second one of the plurality of remote access points is configured to form a corresponding second, different coverage area,
wherein the optical switch bank is configured to dynamically establish a RoF-based optical link over at least one of the plurality of fiber optic cables such that a first peer device in the first coverage area can communicate with a second peer device in the second coverage area at least in part over the RoF-based optical link,
further comprising at least one Wireless Local Area Network (WLAN) access point configured to receive a request from a device other than the first and second peer devices to establish communications between the first and second peer devices.

19. The optical fiber-based wireless communication system of claim 18, wherein the RoF-based optical link is all optical.

20. The optical fiber-based wireless communication system of claim 18, wherein at least one of the plurality of remote access units further comprises at least one of a radio frequency (RF) input/output, a DC input/output, and an optical input/output.

21. A method of enabling communication between a first peer device in a first coverage area and a second peer device in a second, different coverage area, comprising:
optically linking a plurality of remote access points to a head-end unit (HEU) via a plurality of fiber optic cables, each of the plurality of fiber optic cables comprising at least one optical fiber and configured to carry a Radio-over-Fiber (RoF) signal from the HEU to the plurality of remote access points;
forming a first coverage area associated with a first one of the plurality of remote access points;
forming a second coverage area associated with a second one of the plurality of remote access points different from the first coverage area;
dynamically establishing a RoF-based optical link over at least one of the plurality of fiber optic cables to allow the first peer device to communicate with the second peer device at least in part over the RoF-based optical link; and
receiving a request to establish communications between the first peer device and the second peer device from a device other than one of the first and second peer devices.

22. The method of claim 21, further comprising the first one of the plurality of remote access points wirelessly communicating with the first peer device and the second one of the plurality of remote access points wirelessly communicating with the second peer device.

23. The method of claim 21, further comprising receiving a request to establish communications between the first peer device and the second peer device from one of the first and second peer devices.

24. The method of claim 21, further comprising:
sensing a radio frequency of at least one signal received from the first peer device in the first coverage area and a radio frequency of at least one signal received from the second peer device in the second coverage area; and
automatically establishing the RoF-based optical link between the first coverage area and the second coverage area when the radio frequency of the at least one signal received from the first peer device in the first coverage area and the radio frequency of the at least one signal received from the second peer device in the second coverage area are common radio frequencies.

25. The method of claim 21, further comprising the first one of the plurality of remote access points wirelessly communicating with the first peer device using a different wireless communication protocol than a protocol used by the second one of the plurality of remote access points to wirelessly communicate with the second peer device.

26. The method of claim 21, further comprising at least one of the plurality of remote access points wirelessly communicating with at least one of the first or second peer device using a proprietary wireless communication protocol.

27. The method of claim 21, further comprising exchanging data between the first and second peer devices at least in part over the RoF-based optical link.

28. The method of claim 21, wherein the RoF-based optical link is all optical.

29. A method of enabling communication between a first peer device in a first coverage area and a second peer device in a second, different coverage area, comprising:
optically linking a plurality of remote access points to a head-end unit (HEU) via a plurality of fiber optic cables, each of the plurality of fiber optic cables comprising at least one optical fiber and configured to carry a Radio-over-Fiber (RoF) signal from the HEU to the plurality of remote access points;
forming a first coverage area associated with a first one of the plurality of remote access points;
forming a second coverage area associated with a second one of the plurality of remote access points different from the first coverage area;
dynamically establishing a RoF-based optical link over at least one of the plurality of fiber optic cables to allow the first peer device to communicate with the second peer device at least in part over the RoF-based optical link; and
receiving a request to establish communications between the first peer device and the second peer device at a Wireless Local Area Network (WLAN) access point optically coupled to the HEU via a fiber optic cable comprising at least one optical fiber.

30. The method of claim 29, wherein the RoF-based optical link is all optical.

31. The method of claim 29, wherein at least one of the plurality of remote access units further comprises at least one of a radio frequency (RF) input/output, a DC input/output, and an optical input/output.

* * * * *